INVENTORS.
Gerald C. Harris
Edward Goralewski
BY
Harness and Harris
ATTORNEYS.

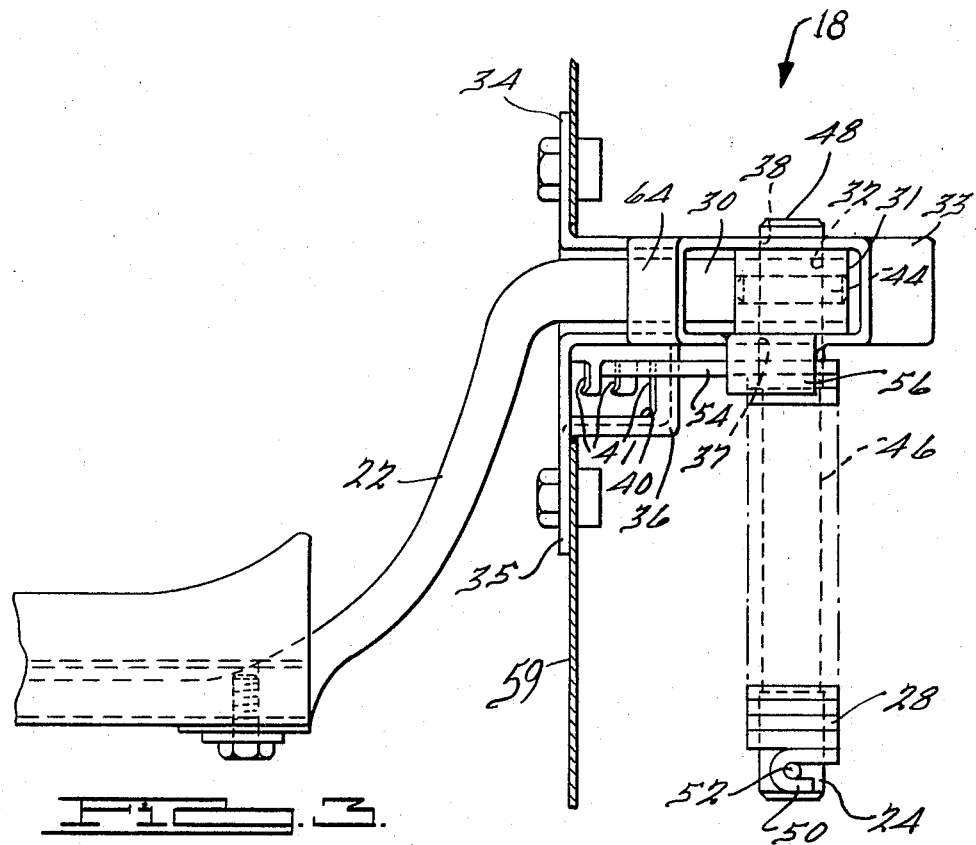
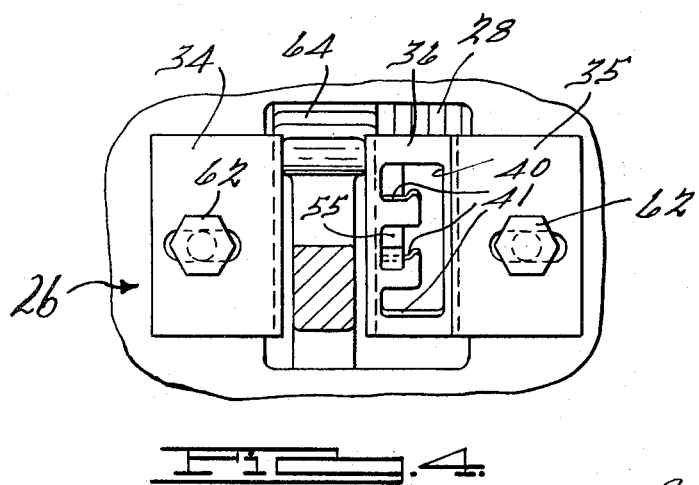

United States Patent Office 3,304,117
Patented Feb. 14, 1967

3,304,117
DECK LID HINGE ASSEMBLY
Gerald C. Harris, Roseville, and Edward Goralewski, Bloomfield Hills, Mich., assignors to Chrysler Corporation, Highland Park, Mich., a corporation of Delaware
Filed Jan. 12, 1965, Ser. No. 425,009
9 Claims. (Cl. 296—76)

This invention relates to a counterbalanced hinge assembly for a closure member of a motor vehicle. More particularly, it relates to a counterbalanced hinge assembly for the deck lid of a motor vehicle.

It is an object of the present invention to provide an improved counterbalanced hinge assembly for a closure member of a motor vehicle.

It is a more specific object to provide a counterbalanced hinge assembly as aforesaid which is compact so as to take up a minimum of interior space.

A still more specific object is to provide a counterbalanced hinge assembly for the deck lid of an automobile which may be substantially hidden from view from within the automobile so as to allow the luggage compartment of the automobile to be aestheticaly incorporated into the passenger area of the vehicle.

Figure 1:
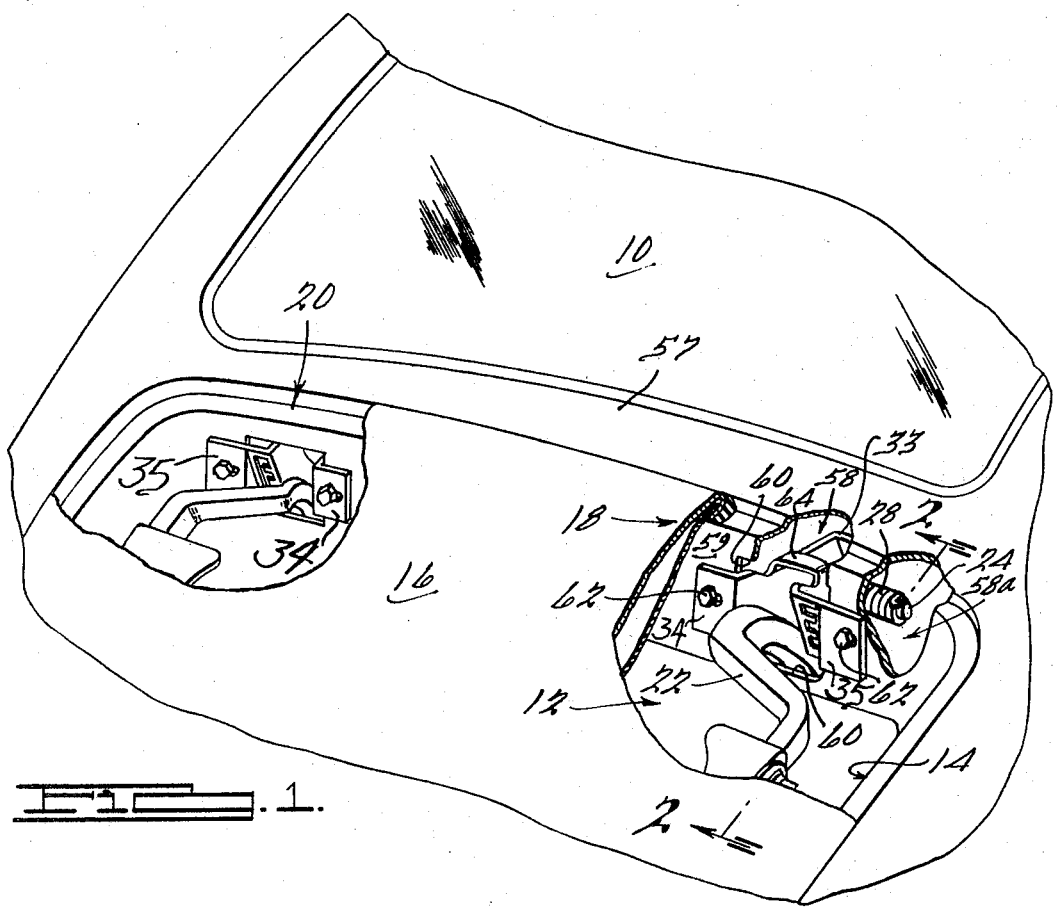
Figure 2:
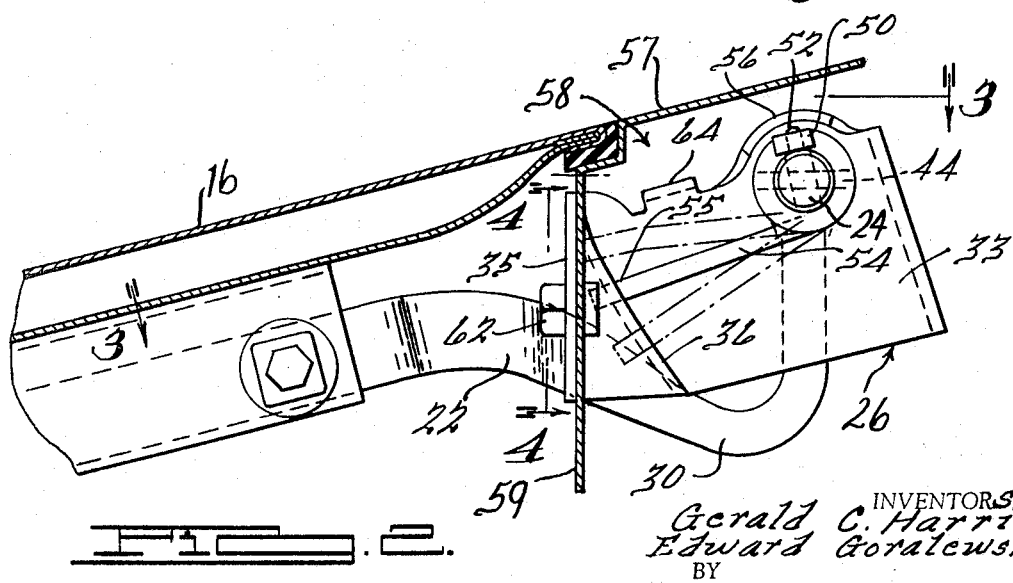

These and other objects, features and advantages of the invention will be apparent from the following description of a preferred embodiment of the invention and from the accompanying drawings wherein:

FIGURE 1 is a fragmentary view of an automobile having deck lid hinge assemblies embodying features of the present invention;

FIGURE 2 is a cross-sectional view taken on line 2—2 of FIGURE 1 and showing details of the right hand deck lid hinge assembly; and FIGURES 3 and 4 are further views of the right hand hinge assembly taken on lines 3—3 and 4—4, respectively, of FIGURE 2.

Referring first to FIGURE 1, the automobile shown fragmentarily therein is of the fastback type and includes a rear window 10, a cargo or trunk compartment 12 having the usual access opening 14, and a deck lid 16 pivotally mounted by right and left hinge assemblies 18 and 20 for movement in the usual manner between the closed or down position shown and an open or upright position allowing acces to compartment 12.

Details of right hange assembly 18 are shown in FIGURES 2-4, to which reference is now made. Left hinge assembly 20 wil be understood to be identical in construction to right hinge assembly 18.

Hinge assembly 18 includes a hinge strap 22, a hinge pin 24, a hinge bracket 26, and a counterbalance spring 28.

Hinge strap 22 is of generaly rectangular cross-section and includes a goose neck portion 30 terminating in a hub 31 at one end of the strap. Hub 31 has a central bore 32.

Hinge bracket 26 includes a central U shaped portion 33, mounting portions 34 and 35, and a spring anchor portion 36.

Aligned holes 37 and 38 are provided in the left and right legs respectively of U shaped portion 33. Holes 37 and 38 each have a diameter equal to the diameter of bore 32 in hub 31 of strap 22. Spring anchor portion 36 is bent out of the plane of mounting portions 34 and 35 to lie along a line generally tangent to an arc generated about the center line of holes 37 and 38. Anchor portion 36 is selectively cut away at 40 to provide a series of vertically spaced horizontal abutment surfaces 41.

Pin 24 is circular in cross-section and has a diameter generally equal to that of holes 37 and 38.

In assembled relation, hub 32 of strap 22 is rotatably received between the legs of U shaped bracket portion 33 and pin 24 passes through hole 37, through the bore 32 in hub 31 and then through hole 38. Pin 24 is fixed in hub 31 by a mounting pin 44 passing through a diametrical hole provided in pin 24 adjacent one end of the latter. Pin 24 is thus divided into an elongated pin portion 46 extending to one side of hub 31 and journaled in hole 37, and a stub pin portion 48 extending to the other side of hub 32 and journaled in hole 38.

Spring 28 is of coiled helical form and is rectangular in cross-section. It is fitted concentrically over elongated pin portion 46. One end of spring 28 is bent over to form a hook portion 50, which is hooked over an anchor pin 52 fixed to elongated portion 46 adjacent the free end of the latter. Spring 28 winds from hook portion 50 about and along elongated pin portion 46 toward hub 32 and terminates in a tail portion 54 which extends tangentially away from the main body of the spring and into cut away 40 where it presses at its free end 55 downwardly against one of the abutment surfaces 41. A hood 56 formed as a lateral extension of one leg of U shaped bracket portion 33 defines at its lower face an arcuate surface concentric with elongated pin portion 46 and overlying the last few coils of spring 28. Hood 56 positions spring 28 concentrically on pin portion 46 and helps to maintain it in that position despite winding or unwinding of the spring.

Referring again to FIGURE 1, the automobile shown therein includes a fixed body structure 57 extending transversely of the automobile immediately forwardly of the trunk compartment 12. Body structure 57, which may for example comprise a box girder structure, defines therewithin a transversely extending cavity 58. The rearward face 59 of structure 57 has an opening 60 therein communicating cavity 58 with compartment 12. Opening 60 has a lesser transverse extent than cavity 58 so as to define a cavity portion 58a disposed to one side of opening 60 and thereby substantialy hidden from view through that opening.

The hinge assembly 18 is mounted to body structure 57 by screws 62 passing through slots in mounting portions 34 and 35 of hinge bracket 26 and into face 59 at opposite sides of opening 60. U shaped portion 33 of bracket 26 extends into cavity 58 through opening 60 and elongated hinge pin portion 46 extends into cavity portion 58a where it and spring 28 carried thereon are out of sight.

Deck lid 16 is fixed in known manner to the free end of hinge strap 22 and to the free end of the hinge strap of hinge assembly 20. Deck lid 16 is thus mounted for pivotal movement about the axis of hinge pin 24 between the closed or down position of FIGURE 1 and an open or upright position allowing access to trunk compartment 12. As lid 12 is moved from its open position toward its closed position, spring end 55 is restrained by its abutment with one of the surfaces 41 and spring end 50 is rotated with pin 24 so that the loading of spring 28 is increased. Thus, when the usual latch holding deck lid 16 in its down position is released, spring 28 unwinds to assist in the opening movement of the lid. Spring 28 is preloaded so that, even with the lid in its extreme up position, the spring exerts a substantial upward force trying to move the lid beyond its upper stop position. Desirably, the spring is preloaded approximately 180° with the lid in its up position so that the total loading with the lid closed is approximately 250°. The preloading of the spring may of course be selectively varied by moving spring end 55 into abutment with a different horizontal surface 41 on hinge bracket 26. A bridge portion 64 of hinge bracket 26 spans the opposite legs of U shaped bracket portion 33 to strengthen the latter and to provide a limiting stop surface for engagement by goose neck portion 30 of strap 22 to define the extreme up position of deck lid 16.

The present invention will thus be seen to provide a compact and simple counterbalanced hinge assembly for an automobile; more particularly, it will be seen to provide a counterbalanced deck lid hinge assembly for an automobile which may be readily hidden from view os as to allow the luggage compartment of the vehicle to be aesthetically incorporated into the passenger or living room area of the vehicle.

While a preferred embodiment of the invention has been illustrated and described in detail, it is to be understood that various changes and modifications may be made in the disclosed embodiment without departing from the scope or spirit of the invention as defined by the appended claims.

We claim:
1. A motor vehicle comprising:
  (A) a rear luggage compartment having an access opening;
  (B) a rear deck lid adapted to close said compartment;
  (C) a hinge strap fixed at one end thereof to said lid;
  (D) a hinge pin fixed to said strap adjacent the other end of, and in substantially perpendicular relation to, said strap and including an elongated portion extending to one side of said strap;
  (E) means mounting said hinge pin on a fixed portion of said vehicle immediately forwardly of said opening for rotation about a substantially horizontal axis, whereby to mount said lid for pivotal movement between a down position closing said opening and an open position allowing access to said compartment;
  (F) a coiled helical spring fixed at one end to the free end of said elongated pin portion and winding therefrom about and progressively along said pin portion toward said strap to a free end generally adjacent said strap; and
  (G) means on said fixed body portion engaging one end of said spring and restraining that end from movement in an unwinding direction.
2. A motor vehicle according to claim 1 wherein said spring is rectangular in cross-section.
3. A motor vehicle comprising:
  (A) a compartment having an access opening;
  (B) a deck lid for said compartment of a size to close said opening;
  (C) a hinge strap fixed at one end thereof to said lid;
  (D) a hinge pin fixed to said strap adjacent the other end of, and in substantially perpendicular relation to, the latter and including an elongated portion extending to one side of said strap and a stub portion extending to the other side of said strap;
  (E) a coiled helical spring fixed at one end to said elongated pin portion and winding therefrom about and progressively along said elongated pin portion;
  (F) a hinge bracket secured to a fixed portion of said vehicle immediately adjacent said opening and including
    (1) a generally "U" shaped portion
      (a) having legs extending generally longitudinally of said vehicle and parallel to said hinge strap and receiving said other end of said hinge strap between its legs, and
      (b) having horizontally aligned apertures in its legs respectively journaling said stub pin portion and said elongated pin portion, whereby to mount said lid for pivotal movement about the axis of said hinge pin between a down position closing said opening and an open position allowing access to said compartment,
    (2) a mounting portion extending generally transversely from the free end of each leg of said "U" shaped portion and each secured to said fixed body portion, and
    (3) a spring anchor portion presenting an anchor surface abutting the free end of said spring and restraining that end from movement in an unwinding direction, whereby said spring selectively stores and releases energy as said deck lid is moved between its aforesaid positions.
4. A motor vehicle according to claim 3 wherein said anchor portion is selectively cut away to define a plurality of vertically spaced restraining anchor surfaces for abutment by the free end of said spring, whereby the loading of said spring may be selectively varied.
5. A motor vehicle according to claim 3 wherein said spring is prestressed so as to be loaded in all positions of said deck lid.
6. A motor vehicle according to claim 3 wherein:
  (A) said spring is fixed to said elongated pin portion at a location spaced from said strap and winds therefrom toward said strap so that its free end is adjacent said strap; and
  (B) the leg of said bracket journaling said elongated pin portion includes a portion defining an arcuate surface concentric with said elongated pin portion and lying adjacent the outer peripheral surface of at least the free end coil of said spring, whereby to maintain said spring concentrically positioned on said elongated pin portion.
7. A motor vehicle comprising:
  (A) a compartment;
  (B) fixed body structure extending transversely of said vehicle adjacent one end of said compartment;
  (C) a closed transversely extending cavity within said body structure having an opening communicating with said compartment of a lesser transverse extent than said cavity, whereby to define a cavity portion to one side of said opening and substantially hidden from view through said opening;
  (D) a hinge strap passing through said opening to dispose one end thereof within said cavity and the other end generally within said compartment;
  (E) a hinge pin within said cavity fixed to said strap adjacent said one end of, and in substantially perpendicular relation to, said strap and including an elongated portion extending to one side of said strap into said cavity portion;
  (F) a closure member fixed to said other end of said strap;
  (G) means within said cavity journaling said hinge pin for rotation about a substantially horizontal axis, whereby to mount said closure member for pivotal movement about said axis between a closed position at least partially blocking the opening to said compartment and open position allowing access to said compartment; and
  (H) a coiled helical spring fitted concentrically over said pin portion and having one end restrained by said fixed body structure and the other end movable in response to the aforesaid pivotal movement of said closure member, whereby said spring selectively stores and releases energy as said closure member is moved between its aforesaid positions.
8. A motor vehicle comprising:
  (A) a compartment;
  (B) fixed body structure extending transversely of said vehicle adjacent one end of said compartment;
  (C) a closed transversely extending cavity within said body structure having an opening communicating with said compartment of a lesser transverse extend than said cavity, whereby to define a cavity portion to one side of said opening and substantially hidden from view through said opening;
  (D) a hinge strap passing through said opening to dispose one end thereof within said cavity and the other end generally within said compartment;
  (E) a hinge pin within said cavity fixed to said strap adjacent said one end of, and in substantially perpen- dicular relative to, said strap and including an elongated portion extending to one side of said strap into said cavity portion;
(F) a closure member fixed to said other end of said strap;
(G) a coiled helical spring fixed at one end to said pin portion at a location on the latter within said cavity portion and winding therefrom about and progressively along said pin portion toward said hinge strap to a free end projecting through said opening alongside said strap; and
(H) means rigid with said fixed body structure engaging said free end and restraining it from movement in an unwinding direction, whereby said spring selectively stores and releases energy as said closure member is moved between its aforesaid positions.

9. A motor vehicle comprising:
(A) a rear luggage compartment having an access opening;
(B) a deck lid for said compartment of a size to close said opening;
(C) fixed body structure extending transversely of said vehicle immediately forwardly of said opening;
(D) a closed transversely extending cavity within said body structure having an opening communicating with said compartment of a lesser transverse extent than said cavity, whereby to define a cavity portion to one side of said cavity opening and substantially hidden from view through said cavity opening;
(E) a hinge strap fixed at one end thereof to said lid;
(F) a hinge pin fixed to said strap adjacent the other end of, and in substantially perpendicular relation to, the latter and including an elongated portion extending to one side of said strap and a stub portion extending to the other side of said strap;
(G) a hinge bracket secured to said fixed body structure and including
(1) a generally "U" shaped portion
(a) passing through said cavity opening and into said cavity and
(b) having horizontally aligned apertures in its legs respectively journaling, in the leg nearest said cavity portion, said elongated pin portion and, in the other leg, said stub pin portion, whereby to dispose said elongated pin portion within said cavity portion and mount said lid for pivotal movement about the axis of said hinge pin between a down position closing said compartment and an open position allowing access thereto,
(2) a mounting portion extending generally transversely of the free end of each leg of said "U" shaped portion and each secured to said fixed body structure at a respective side of said cavity opening, and
(3) a spring anchor portion presenting a horizontal anchor surface; and
(H) a coiled helical spring fixed at one end to said elongated pin portion at a location on the latter within said cavity portion and winding therefrom about and progressively along said elongated pin portion toward said hinge strap to a free end projecting through said cavity opening alongside said nearest leg for abutting engagement with said anchor surface, whereby to restrain said free end from movement in an unwinding direction so that said spring selectively stores and releases energy as said closure member is moved between its aforesaid positions.

References Cited by the Examiner
UNITED STATES PATENTS

| | | | |
|---|---|---|---|
| 2,626,421 | 1/1953 | Lyons | 16—188 |
| 3,067,453 | 12/1962 | Lyons | 16—180 |
| 3,069,720 | 12/1962 | Gessler | 16—128.1 |

MILTON BUCHLER, *Primary Examiner.*

BENJAMIN HERSH, *Examiner.*

J. H. BRANNEN, *Assistant Examiner.*